United States Patent
Zhang et al.

(10) Patent No.: US 12,498,060 B2
(45) Date of Patent: Dec. 16, 2025

(54) FRACTURING TRANSPORTATION SYSTEM

(71) Applicant: Yantai Jereh Petroleum Equipment & Technologies Co., Ltd., Yantai (CN)

(72) Inventors: Shulin Zhang, Yantai (CN); Guoling Ju, Yantai (CN); Dejian Bao, Yantai (CN); Kaichong Wu, Yantai (CN); Zhu Jin, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 33 days.

(21) Appl. No.: 18/195,391

(22) Filed: May 10, 2023

(65) Prior Publication Data
US 2023/0272701 A1 Aug. 31, 2023

Related U.S. Application Data

(63) Continuation of application No. PCT/CN2020/136775, filed on Dec. 16, 2020.

(30) Foreign Application Priority Data

Oct. 22, 2020 (CN) .......................... 202022368764.X (51) Int. Cl.
*F16L 11/08* (2006.01)
*E21B 43/26* (2006.01)
*F16L 33/01* (2006.01)

(52) U.S. Cl.
CPC ........ *F16L 11/081* (2013.01); *E21B 43/2607* (2020.05); *F16L 11/083* (2013.01); *F16L 33/01* (2013.01)

(58) Field of Classification Search
CPC ..... E21B 43/2607; F16L 11/083; F16L 11/16; F16L 11/081; F16L 33/01; F16L 11/08
See application file for complete search history.

(56) References Cited

U.S. PATENT DOCUMENTS

2007/0034275 A1*  2/2007  Henry .................. F16L 11/086
                                                138/124
2016/0376864 A1* 12/2016  Roesner ................ E21B 33/068
                                                166/308.1
(Continued)

FOREIGN PATENT DOCUMENTS

CN    206942745 U    1/2018
CN    108291670 A    7/2018
(Continued)

OTHER PUBLICATIONS

International Search Report and Written Opinion mailed on Jul. 21, 2021, received for PCT Application PCT/CN2020/136775, filed on Dec. 16, 2020, 15 pages including English Translation.

*Primary Examiner* — Atif H Chaudry
(74) *Attorney, Agent, or Firm* — XSENSUS LLP (57) ABSTRACT

A fracturing transportation system, which includes a high-low pressure manifold skid, including a plurality of first high-pressure input ends and a first high-pressure output end; a plurality of first high-pressure pipes, arranged in one-to-one correspondence with the first high-pressure input ends, an end of one first high-pressure pipe is directly connected with a corresponding one of the first high-pressure input ends, and another end of the first high-pressure pipe is configured to be directly connected with an output end of a fracturing device; and a second high-pressure pipe, an end of the second high-pressure pipe is directly connected with the first high-pressure output end; the first high-pressure pipe and the second high-pressure pipe are configured to bear a pressure greater than or equal to 100 MPa, and at least one of the first high-pressure pipe and the second high-pressure pipe adopts a high-pressure flexible pipe.

13 Claims, 2 Drawing Sheets

(56) References Cited

U.S. PATENT DOCUMENTS

| | | | |
|---|---|---|---|
| 2019/0010781 A1* | 1/2019 | Tran | E21B 34/025 |
| 2020/0182236 A1* | 6/2020 | Beisel | F04B 1/053 |
| 2020/0277845 A1 | 9/2020 | Kajaria | |
| 2021/0131247 A1* | 5/2021 | Ungchusri | E21B 43/26 |
| 2021/0156240 A1* | 5/2021 | Cicci | E21B 43/2607 |
| 2021/0317920 A1* | 10/2021 | Travis | F16K 1/24 |

FOREIGN PATENT DOCUMENTS

| | | |
|---|---|---|
| CN | 110566173 A | 12/2019 |
| CN | 110821464 A | 2/2020 |
| CN | 111503517 A | 8/2020 |
| CN | 211230420 U | 8/2020 |
| EP | 0263239 A1 | 4/1988 |
| WO | 2006/005689 A1 | 1/2006 |
| WO | 2019/200083 A1 | 10/2019 |

* cited by examiner

FRACTURING TRANSPORTATION SYSTEM

CROSS-REFERENCE TO RELATED APPLICATIONS

The application is a continuation of PCT International Patent Application No. PCT/CN2020/136775, filed on Dec. 16, 2020, which claims priority to the Chinese Patent Application No. 202022368764.X, filed on Oct. 22, 2020, for all purposes, the entire disclosure of which is incorporated herein by reference as part of the present application.

TECHNICAL FIELD

The present disclosure relates to a fracturing transportation system.

BACKGROUND

In the field of oil and gas exploitation, fracturing technology refers to a technology that makes oil and gas reservoirs form cracks by hydraulic action during oil or gas production. By fracturing technology, the oil and gas reservoirs are fractured, which can improve the underground flow environment of oil or natural gas and increase the oil well production.

On the other hand, the world is rich in shale gas resources, but because of the low permeability of shale formation, it has not been widely developed at present. As one of the core technologies of shale gas exploitation, fracturing technology can be widely used in shale reservoir reconstruction and shale gas exploitation. Common fracturing techniques can include multi-stage fracturing, clean water fracturing, synchronous fracturing, hydraulic jet fracturing and repeated fracturing.

SUMMARY

The embodiment of the present disclosure provides a fracturing transportation system. The fracturing transportation system adopts high-pressure flexible pipe to partially or completely replace high-pressure metal hard pipe, and high-pressure flexible pipes can be directly used to connect between high-low pressure manifold skid and fracturing truck, between high-low pressure manifold skid and shunt manifold skid, or between shunt manifold skid and fracturing wellhead, without using elbow and multiple sections of pipes for angle and length change, thus reducing the complexity of pipeline layout, improving installation efficiency, and reducing installation difficulty and labor intensity of operators on site. On the other hand, by adopting the flexible high-pressure pipe, the fracturing transportation system can avoid the high-pressure flexible pipe from shaking during the transportation of fracturing fluid, thereby improving the service life of products and reducing the unsafe risks on site.

At least one embodiment provides a fracturing transportation system, which includes: a high-low pressure manifold skid, comprising a plurality of first high-pressure input ends and a first high-pressure output end; a plurality of first high-pressure pipes, arranged in one-to-one correspondence with the first high-pressure input ends, an end of one first high-pressure pipe is directly connected with a corresponding one of the first high-pressure input ends, and another end of the first high-pressure pipe is configured to be directly connected with an output end of a fracturing truck; a shunt manifold skid, comprising a second high-pressure input end and a second high-pressure output end; a second high-pressure pipe, an end of the second high-pressure pipe is directly connected with the first high-pressure output end, and another end of the second high-pressure pipe is directly connected with the second high-pressure input end; and a third high-pressure pipe, an end of the third high-pressure pipe is directly connected with the second high-pressure output end, and another end of the third high-pressure pipe is configured to be directly connected with a fracturing wellhead, the first high-pressure pipe, the second high-pressure pipe and the third high-pressure pipe are configured to bear a pressure greater than or equal to 100 MPa, and at least one of the first high-pressure pipe, the second high-pressure pipe and the third high-pressure pipe adopts a high-pressure flexible pipe.

For example, in the fracturing transportation system provided by an embodiment of the present disclosure, the first high-pressure pipe, the second high-pressure pipe and the third high-pressure pipe all adopt the high-pressure flexible pipe.

For example, in the fracturing transportation system provided by an embodiment of the present disclosure, the first high-pressure pipe between each of the first high-pressure input ends and the output end of the fracturing truck is a single continuous high-pressure flexible pipe, the second high-pressure pipe between the high-low pressure manifold skid and the shunt manifold skid is a single continuous high-pressure flexible pipe.

For example, in the fracturing transportation system provided by an embodiment of the present disclosure, a diameter of the first high-pressure pipe is in a range from 2 to 5 inches, a diameter of the second high-pressure pipe is in a range from 3 to 7 inches, and a diameter of the third high-pressure pipe is in a range from 3 to 7 inches.

For example, in the fracturing transportation system provided by an embodiment of the present disclosure, the fracturing transportation system is a fracturing transportation system of fracturing fluid for shale gas exploitation.

For example, in the fracturing transportation system provided by an embodiment of the present disclosure, the high-pressure flexible pipe comprises a lining layer, at least one internal pressure enhancing layer, a tensile layer and an outer protective layer from inside to outside out, and a material of the lining layer comprises wear-resistant material.

For example, in the fracturing transportation system provided by an embodiment of the present disclosure, the at least one internal pressure enhancement layer comprises a plurality of internal pressure enhancement layers, and the high-pressure flexible pipe further comprises an isolation layer located between two adjacent one of the internal pressure enhancement layers and between the internal pressure enhancement layers and the tensile layer.

For example, in the fracturing transportation system provided by an embodiment of the present disclosure, at least one of the internal pressure enhancement layer and the tensile layer is a metal wire winding layer or a non-metallic wire winding layer.

For example, in the fracturing transportation system provided by an embodiment of the present disclosure, a material of the lining layer comprises at least one selected from the group consisting of engineering plastics, thermoplastic elastomers and rubber-plastic alloys.

For example, in the fracturing transportation system provided by an embodiment of the present disclosure, the outer protective layer comprises at least one selected from the group consisting of a rubber layer and a metal armor layer.

For example, in the fracturing transportation system provided by an embodiment of the present disclosure, the third high-pressure pipe adopts the high-pressure flexible pipe, and a length of the high-pressure flexible pipe adopted by the third high-pressure pipe is more than 6 meters.

For example, in the fracturing transportation system provided by an embodiment of the present disclosure, the fracturing transportation system comprises a plurality of high-low pressure manifold skids connected in series, and further comprises a fourth high-pressure pipe, the high-low pressure manifold skid further comprises a third high-pressure input end, an end of the fourth high-pressure pipe is directly connected with the first high-pressure output end of a previous high-low pressure manifold skid among the plurality of high-low pressure manifold skids connected in series, and another end of the fourth high-pressure pipe is directly connected with the third high-pressure input pipe of a next high-low pressure manifold skid among the plurality of high-low pressure manifold skids connected in series, the second high-pressure pipe is directly connected with the first high-pressure output end of a last high-low pressure manifold skid among the plurality of high-low pressure manifold skids connected in series.

For example, in the fracturing transportation system provided by an embodiment of the present disclosure, the fourth high-pressure pipe adopts the high-pressure flexible pipe and is configured to bear a pressure greater than or equal to 100 MPa.

For example, in the fracturing transportation system provided by an embodiment of the present disclosure, the shunt manifold skid comprises a plurality of sub-manifold skids, the fracturing transportation system comprises a plurality of third high-pressure pipes, and the sub-manifold skids and the third high-pressure pipes are arranged in one-to-one correspondence, the plurality of third high-pressure pipes are configured to be directly connected with a plurality of fracturing wellheads, and a number of the plurality of fracturing wellheads is the same as a number of the plurality of sub-manifold skids.

For example, in the fracturing transportation system provided by an embodiment of the present disclosure, the third high-pressure pipe between each of the sub-manifold skids and a corresponding one of the fracturing wellheads is a single continuous high-pressure flexible pipe.

BRIEF DESCRIPTION OF DRAWINGS

Those skilled in the art will have a better understanding of the present disclosure through the following drawings, and the advantages of the present disclosure can be more clearly reflected. The drawings described here are only for illustrative purposes of selected embodiments, not all possible implementations, and are not intended to limit the scope of the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

In a fracturing well site layout, due to the characteristics of high pressure and high erosion of fracturing fluid, high-pressure metal hard pipes with erosion resistance and high pressure resistance are usually used in fracturing fluid transportation channels between fracturing truck and high-low pressure manifold skid, between high-low pressure manifold skid and shunt manifold skid, and between shunt manifold skid and wellhead, the high-pressure metal hard pipes are changed in direction through elbows and connected by connectors such as union and flange. However, because the length and direction of the high-pressure metal hard pipe are fixed, and because of the complex and changeable terrain of the fracturing well site, it is needed to use multiple sections of high-pressure metal hard pipes and connectors such as union and flange to change the length and elbow to change the direction for positions requiring length and direction change. Therefore, adopting high-pressure metal hard pipe to transport fracturing fluid is not only complicated in layout, low in installation efficiency and difficult in connection, but also increases the difficulty of installation and the labor intensity of operators on site. On the other hand, because there are many bends and turns, it is easy to cause great erosion and shake of the high-pressure metal hard pipe in the process of fracturing fluid transportation by using high-pressure metal hard pipe, thus the service life of the product is reduced and the unsafe risk on site is increasing.

In addition, in the general layout of fracturing well site, the transportation pipes between the fracturing truck and the high-low pressure manifold skid, the transportation pipes between the high-low pressure manifold skid and the shunt manifold skid, and the transportation pipes between the shunt manifold skid and the wellhead are all "high-pressure main pipelines". Because these high-pressure main pipelines need to meet the requirements of high displacement, high flow rate, high pressure and high wear resistance in the application scenarios of large-scale fracturing technology, it has been a long-standing idea that these high-pressure main pipelines (especially high-pressure main pipelines not less than 100 MPa) must use metal hard pipes.

Therefore, Embodiments of the present disclosure provide a fracturing transportation system. The fracturing transportation system includes a high-low pressure manifold skid, a plurality of first high-pressure pipes, a shunt manifold skid, a second high-pressure pipe and a third high-pressure pipe. The high-low pressure manifold skid includes a plurality of first high-pressure input ends and a first high-pressure output end; the plurality of first high-pressure pipes are arranged in one-to-one correspondence with the plurality of first high-pressure input ends, an end of one first high-pressure pipe is directly connected with a corresponding one of the first high-pressure input ends, and another end of the first high-pressure pipe is configured to be directly connected with an output end of a fracturing truck; the shunt manifold skid includes a second high-pressure input end and a second high-pressure output end; an end of the second high-pressure pipe is directly connected with the first high-pressure output end, and another end of the second high-pressure pipe is directly connected with the second high-pressure input end; an end of the third high-pressure pipe is directly connected with the second high-pressure output end, and another end of the third high-pressure pipe is configured to be directly connected with a fracturing wellhead. The first high-pressure pipe, the second high-pressure pipe and the third high-pressure pipe are configured to bear a pressure greater than or equal to 100 MPa, and at least one of the first high-pressure pipe, the second high-pressure pipe and the third high-pressure pipe adopts a high-pressure flexible pipe. Because at least one of the first high-pressure pipe, the second high-pressure pipe and the third high-pressure pipe in the fracturing transportation system adopts the high-pressure flexible pipe, the fracturing transportation system can be directly connected by the high-pressure flexible pipe between the high-low pressure manifold skid and the fracturing truck, between the high-low pressure manifold skid and the shunt manifold skid, or between the shunt manifold skid and the fracturing wellhead, and an angle and length can be changed without using elbows and multiple sections of pipes, so that the complexity of pipeline layout can be reduced, the installation efficiency can be improved, and the installation difficulty and the labor intensity of the operator can be reduced on site. On the other hand, by adopting the flexible high-pressure pipe, the fracturing transportation system can avoid the high-pressure flexible pipe from shaking during the transportation of fracturing fluid, thereby improving the service life of products and reducing the unsafe risks on site.

Hereinafter, the fracturing transportation system provided by the embodiments of the present disclosure will be described in detail with reference to the accompanying drawings.

Figure 1:
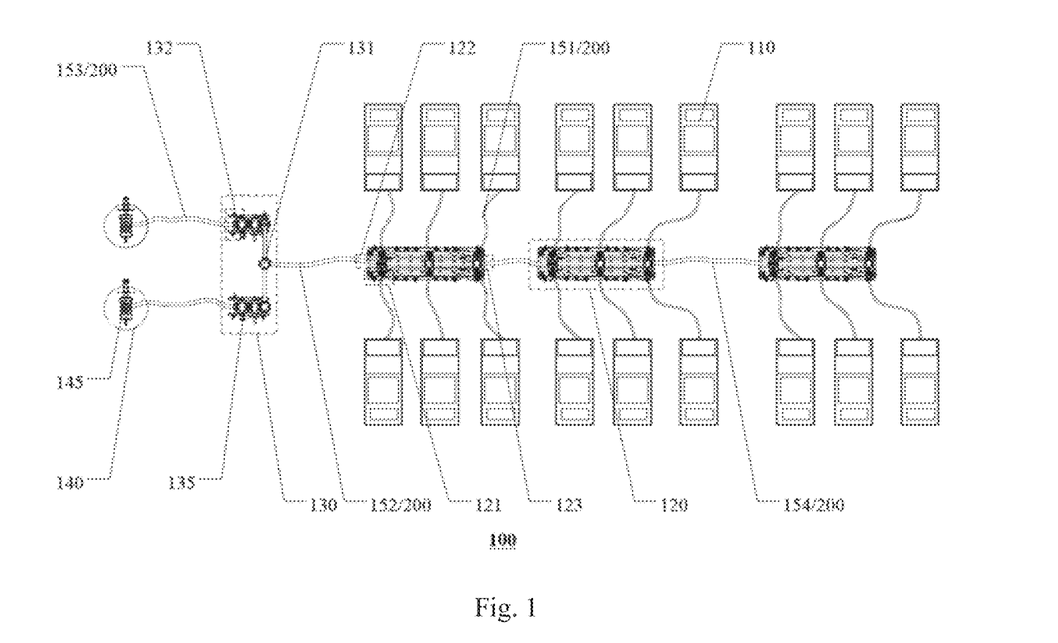
FIG. 1 is a schematic diagram of a fracturing transportation system provided by an embodiment of the present disclosure.

An embodiment of the present disclosure provides a fracturing transportation system. FIG. 1 is a schematic diagram of a fracturing transportation system provided by an embodiment of the present disclosure.

As illustrated by FIG. 1, the fracturing transportation system 100 includes a high-low pressure manifold skid 120, a plurality of first high-pressure pipes 151, a shunt manifold skid 130, a second high-pressure pipe 152 and a third high-pressure pipe 153. The high-low pressure manifold skid 120 includes a plurality of first high-pressure input ends 121 and a first high-pressure output end 122. The plurality of first high-pressure pipes 151 are arranged in one-to-one correspondence with the plurality of first high-pressure input ends 121, an end of one first high-pressure pipe 151 is directly connected with a corresponding one of the first high-pressure input end 121, and another end of the first high-pressure pipe 151 is configured to be directly connected with an output end 112 of a fracturing device 110, such as a fracturing truck. Fluid (such as fracturing fluid) pressurized by the fracturing truck 110 can flow into the high-low pressure manifold skid 120 through the first high-pressure pipe 151 and the first high-pressure input end 121, and be output from the first high-pressure output end 122. In addition, one high-low pressure manifold skid 120 includes the plurality of first high-pressure input ends 121 to connect the plurality of first high-pressure pipes 151, and then to connect a plurality of fracturing trucks 110, thereby the flow of fluid in the high-low pressure manifold skid 120 can be increased. It should be noted that the above-mentioned "directly connected" means that the first high-pressure pipe and the corresponding first high-pressure input end are not connected through other pipes, but are directly connected.

As illustrated by FIG. 1, the shunt manifold skid 130 includes a second high-pressure input end 131 and a second high-pressure output end 132; an end of the second high-pressure pipe 152 is directly connected with the first high-pressure output end 122, and another end of the second high-pressure pipe 152 is directly connected with the second high-pressure input end 131. The high-pressure fluid output from the first high-pressure output end 122 of the high-low pressure manifold skid 120 can enter the shunt manifold skid 130 through the second high-pressure pipe 152. An end of the third high-pressure pipe 153 is directly connected with the second high-pressure output end 132, and another end of the third high-pressure pipe 153 is configured to be directly connected with a fracturing wellhead 140. The high-pressure fluid output from the second high-pressure output end 132 of the shunt manifold skid 130 can enter the fracturing wellhead 140 through the third high-pressure pipe 153. The first high-pressure pipe 151, the second high-pressure pipe 152 and the third high-pressure pipe 153 are configured to bear a pressure greater than or equal to 100 MPa; and at least one of the first high-pressure pipe 151, the second high-pressure pipe 152 and the third high-pressure pipe 153 adopts the high-pressure flexible pipe 200.

In the fracturing transportation system provided by the embodiment of the present disclosure, because at least one of the first high-pressure pipe, the second high-pressure pipe and the third high-pressure pipe in the fracturing transportation system adopts a high-pressure flexible pipe, and the high-pressure flexible pipe can be freely bent, it is convenient to disassemble and install the fracturing equipment on site. Therefore, the fracturing transportation system can be directly connected by high-pressure flexible pipes between the high-low pressure manifold skid and the fracturing truck, between the high-low pressure manifold skid and the shunt manifold skid, or between the shunt manifold skid and the fracturing wellhead, without using elbows and multiple sections of pipes for angle and length change, thus simplifying the complexity of pipeline layout, improving the installation efficiency, making maintenance more convenient, and reducing the installation difficulty and the labor intensity of operators on site. In addition, the high-pressure flexible pipe can directly connect the high-low pressure manifold skid with the fracturing truck, the high-low pressure manifold skid with the shunt manifold skid, or the shunt manifold skid with the fracturing wellhead, thus a number of connectors is reduced and the risk of fluid leakage is reduced, thus being more environmentally friendly and efficient. On the other hand, by adopting the flexible high-pressure pipe, the fracturing transportation system can further avoid the high-pressure flexible pipe from shaking during the transportation of fracturing fluid, thereby improving the service life of products and reducing the unsafe risks on site.

In addition, the fracturing transportation system provided by the embodiment of the present disclosure overcomes the technical prejudice in the field, and creatively uses the high-pressure flexible pipe, so that the complexity of pipeline layout can be reduced under the condition of meeting the requirements of high displacement, high flow rate, high pressure and high wear resistance. It can be said that the technical prejudice has been overcome and unexpected technical effects have been achieved.

For example, the first high-pressure pipe 151, the second high-pressure pipe 152 and the third high-pressure pipe 153 are configured to bear a pressure greater than or equal to 100 MPa and less than or equal to 140 MPa. As another example, the first high-pressure pipe 151, the second high-pressure pipe 152 and the third high-pressure pipe 153 are configured to bear a pressure greater than or equal to 140 MPa.

In some examples, the fracturing transportation system can be a fracturing transportation system of fracturing fluid for shale gas exploitation. Of course, the embodiments of the present disclosure include but are not limited thereto, and the above fracturing transportation system can also be applied in other fields where fracturing technology is needed.

In some examples, the fracturing transportation system described above is configured to transport fracturing fluid, and a sand ratio of fracturing fluid is in a range from 5% to 50%. Because the fracturing fluid has a high sand ratio, it has strong erosivity. In the case that at least one of the first high-pressure pipe, the second high-pressure pipe and the third high-pressure pipe in the fracturing transportation system adopts high-pressure flexible pipe, on the one hand, the high-pressure flexible pipe can better meet the operation requirements of high pressure, high flow rate and high sand ratio, and can realize continuous sand fracturing operation; on the other hand, the high-pressure flexible pipe changes direction by bending or curving, which can prevent fracturing fluid from directly impacting the high-pressure flexible pipe at a large angle. Therefore, the fracturing transportation system can avoid the high-pressure flexible pipe from shaking during the transportation of fracturing fluid, and reduce the unsafe risk on site; in addition, the fracturing transportation system can prolong the service life of high-pressure flexible pipe and improve the continuous operation time. It should be noted that the above sand ratio refers to a mass percentage of fracturing sand in fracturing fluid.

For example, the fracturing sand can be 100 mesh silt, 40 to 70 mesh quartz sand, ceramsite, etc. Of course, embodiments of the present disclosure include but are not limited thereto.

For example, in the case that it is applied to shale gas fracturing operation, the fracturing transportation system using the high-pressure metal hard pipe to transport fracturing fluid usually can continuously carry out sand adding operation for about 2 hours, while the fracturing transportation system provided by the embodiment of the present disclosure can continuously carry out sand adding operation for about 10 hours, which is five times as much as the fracturing transportation system using the high-pressure metal hard pipe to transport fracturing fluid. It can be seen that the fracturing transportation system provided by the embodiment of the present disclosure greatly prolongs the service life of products and improves the production efficiency.

In some examples, as illustrated by FIG. 1, the first high-pressure pipe 151, the second high-pressure pipe 152 and the third high-pressure pipe 153 all adopt the high-pressure flexible pipe 200. Therefore, the fracturing transportation system can greatly reduce the complexity of pipeline layout, improve the installation efficiency, and reduce the installation difficulty and labor intensity of operators. In addition, the fracturing transportation system can greatly reduce the risk of fluid leakage, improve the service life of products, and reduce the unsafe risk on site.

In some examples, as illustrated by FIG. 1, the first high-pressure pipe 151 between each first high-pressure input end 121 and the output end 112 of the fracturing truck 110 connected thereto is a single continuous high-pressure flexible pipe 200. The second high-pressure pipe 152 between the high-low pressure manifold skid 120 and the shunt manifold skid 130 is a single continuous high-pressure flexible pipe 200. Therefore, the fracturing transportation system can reduce the complexity of pipeline layout, improve the installation efficiency and reduce the installation difficulty and labor intensity of operators. In addition, the fracturing transportation system further reduces the risk of fluid leakage, improves the service life of products, and reduces the unsafe risk on site.

In some examples, as illustrated by FIG. 1, the high-pressure flexible pipe 200 is not provided with or connected with an elbow, so that the risk of fluid leakage can be reduced, and the high-pressure flexible pipe can be prevented from shaking during the transportation of fracturing fluid, thereby improving the service life of products and reducing the unsafe risk on site.

In some examples, a diameter of the first high-pressure pipe ranges from 2 to 5 inches; a diameter of the second high-pressure pipe ranges from 3 to 7 inches, and a diameter of the third high-pressure pipe ranges from 3 to 7 inches. It should be noted that the above-mentioned diameter is the inner diameter of the first high-pressure pipe, the second high-pressure pipe or the third high-pressure pipe.

In some examples, as illustrated by FIG. 1, a number of the first high-pressure input ends 121 included in one high-low pressure manifold skid 120 is the same as that of the corresponding fracturing trucks 110. The high-low pressure manifold skid 120 shown in FIG. 1 includes six first high-pressure input ends 121, and the six first high-pressure input ends 121 are correspondingly connected with six fracturing trucks 110. Of course, the embodiments of the present disclosure include but are not limited thereto, and the number of the first high-pressure input ends of the high-low pressure manifold skid and the number of fracturing trucks can be designed according to actual needs. For example, the number of the first high-pressure input end of the high-low pressure manifold skid and the number of fracturing trucks are designed according to the required displacement or flow of fracturing fluid.

In some examples, as illustrated by FIG. 1, the fracturing transportation system 100 may include a plurality of high-low pressure manifold skids 120 connected in series. In this case, the fracturing transportation system 100 further includes a fourth high-pressure pipe 154, and the high-low pressure manifold skid 120 further includes a third high-pressure input end 123; an end of the fourth high-pressure pipe 154 is directly connected with the first high-pressure output end 122 of a previous high-low pressure manifold skid 120 among the plurality of high-low pressure manifold skids 120 connected in series, and another end of the fourth high-pressure pipe 154 is directly connected with the third high-pressure input end 123 of a next high-low pressure manifold skid 120 among the plurality of high-low pressure manifold skids 120 connected in series, that is to say, the plurality of high-low pressure manifold skids 120 are connected in series through the fourth high-pressure pipe 154. In this case, the second high-pressure pipe 152 is directly connected with the first high-pressure output end 122 of a last high-low pressure manifold skid 120 among the plurality of high-low pressure manifold skids 120 connected in series. Therefore, the fracturing transportation system can further improve the flow or displacement of fluid through the plurality of high-low pressure manifold skids connected in series.

In some examples, as illustrated by FIG. 1, the fourth high-pressure pipe 154 also adopts the high-pressure flexible pipe 200 described above, and is configured to bear a pressure greater than or equal to 100 MPa. Therefore, the connection mode and layout between the plurality of high-low pressure manifold skids connected in series are also simple, so that the installation efficiency can be improved and the installation difficulty and the labor intensity of operators can be reduced on site. In addition, the fracturing transportation system further reduces the risk of fluid leakage, improves the service life of products, and reduces the unsafe risk on site.

For example, the fourth high-pressure pipe is configured to bear a pressure greater than or equal to 100 MPa and less than or equal to 140 MPa. As another example, the fourth high-pressure pipe 154 is configured to bear a pressure greater than or equal to 140 MPa. In some examples, as illustrated by FIG. 1, multiple fracturing trucks 110 connected by one high-low pressure manifold skid 120 can form a fracturing truck group; different high-low pressure manifold skids 120 are connected with different fracturing truck groups.

In some examples, as illustrated by FIG. 1, the shunt manifold skid 130 may include a plurality of sub-manifold skids 135, the fracturing transportation system 100 includes the plurality of third high-pressure pipes 153, and the plurality of sub-manifold skids 135 are arranged in one-to-one correspondence with the plurality of third high-pressure pipes 153, the third high-pressure pipes 153 are configured to be directly connected with a plurality of fracturing wellheads 140, the number of which is the same as that of the sub-manifold skids 135. Therefore, the fracturing transportation system can realize the continuous fracturing operation for different fracturing wellheads 40 through the control of the shunt manifold skid 130.

In some examples, as illustrated by FIG. 1, the third high-pressure pipe 153 between each sub-manifold skid 135 and the corresponding fracturing wellhead 140 is a single continuous high-pressure flexible pipe 200. Therefore, the fracturing transportation system can reduce the complexity of pipeline layout, improve the installation efficiency and reduce the installation difficulty and labor intensity of operators on site. In addition, the fracturing transportation system further reduces the risk of fluid leakage, improves the service life of products, and reduces the unsafe risk on site.

Figure 2:
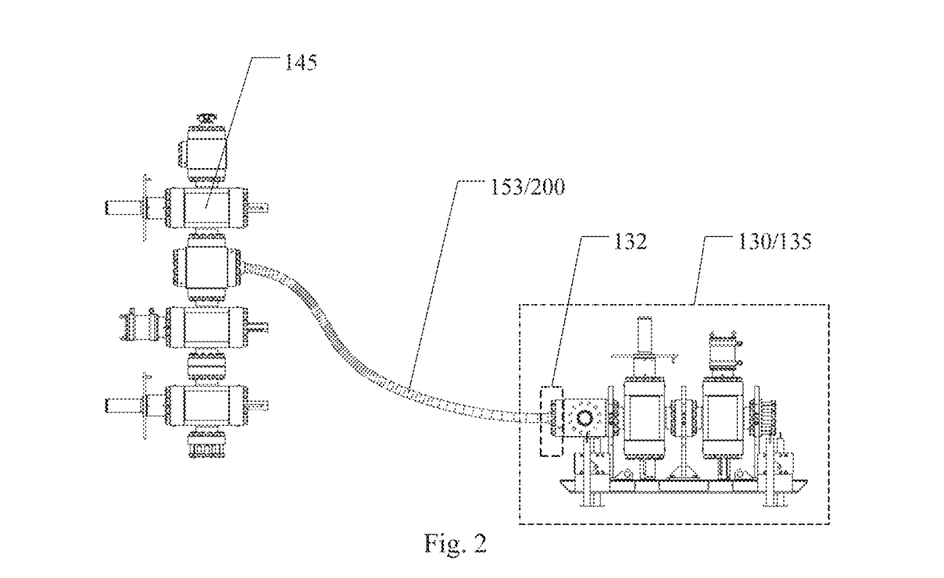
FIG. 2 is a schematic diagram of a connection between a sub-manifold skid and a fracturing inlet in a fracturing transportation system according to an embodiment of the present disclosure.

FIG. 2 is a schematic diagram of a connection between a sub-manifold skid and a fracturing inlet in a fracturing transportation system according to an embodiment of the present disclosure. As illustrated by FIG. 2, an end of the third high-pressure pipe 153 is directly connected with the second high-pressure output end 132 of the sub-manifold skid 135, and another end of the third high-pressure pipe 153 is configured to be directly connected with the fracturing wellhead 140.

For example, as illustrated by FIG. 2, the fracturing wellhead 140 may include a fracturing tree 145, and the high-pressure fluid output from the high-pressure output end 132 of the sub-manifold skid 135 may flow into the fracturing tree 145 to realize fracturing operation.

Figure 3:
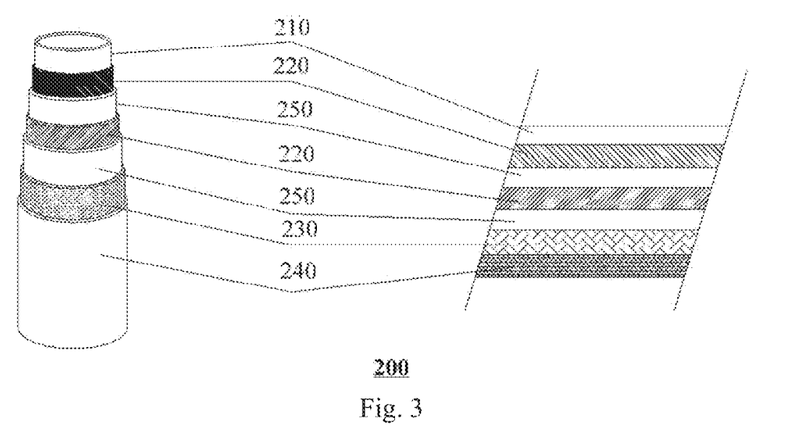
FIG. 3 is a layered schematic diagram of a high-pressure flexible pipe provided by an embodiment of the present disclosure.

FIG. 3 is a layered schematic diagram of a high-pressure flexible pipe provided by an embodiment of the present disclosure. As illustrated by FIG. 3, the high-pressure flexible pipe 200 includes a lining layer 210, at least one internal pressure enhancing layer 220, a tensile layer 230 and an outer protective layer 240 from inside to outside. A material of the lining layer 210 includes wear-resistant materials, so that it is convenient to transport fracturing fluid with sand and strong erosivity.

For example, the material of the lining layer 210 includes at least one selected from the group consisting of engineering plastics, thermoplastic elastomers and rubber-plastic alloys. Of course, the embodiments of the present disclosure include but are not limited thereto, and other suitable wear-resistant materials can also be used as the material of the lining layer.

In some examples, as illustrated by FIG. 3, the at least one internal pressure enhancement layer 220 includes a plurality of internal pressure enhancement layers 220; the high-pressure flexible pipe 200 further includes an isolation layer 250, which is located between two adjacent ones of the internal pressure enhancement layers 220 and between the internal pressure enhancement layers 220 and the tensile layer 230. FIG. 2 shows two internal pressure enhancement layers 220, however, the embodiment of the present disclosure includes but is not limited thereto, and a number of internal pressure enhancement layers can be designed according to actual needs, for example, the number of internal pressure enhancement layers can be 3 to 8.

In some examples, at least one of the internal pressure enhancement layer 220 and the tensile layer 230 is a metal wire winding layer. The internal pressure resistance and tensile properties of high-pressure flexible pipe can be effectively enhanced by using metal wire winding layer. Of course, the embodiments of the present disclosure include but are not limited thereto, and at least one of the internal pressure enhancement layer 220 and the tensile layer 230 may also be a non-metallic wire winding layer, as long as a strength of the non-metallic wire can meet the requirements. For example, a material of non-metallic wires can be composite materials with high strength and high elasticity.

In some examples, the material of the lining layer 210 includes at least one selected from the group consisting of engineering plastics, thermoplastic elastomers and rubber-plastic alloys.

In some examples, the outer protective layer includes at least one selected from the group consisting of a rubber layer and a metal armor layer. Of course, the embodiments of the present disclosure include but are not limited thereto, and the outer protective layer can also be other scratch-resistant protective layers.

In some examples, a length of the high-pressure flexible pipe is greater than 1 meter. Therefore, the high-pressure flexible pipe can directly connect two devices that need to be connected (such as fracturing truck, high-low pressure manifold skid, shunt manifold skid, etc.) more conveniently, without the need for combination of multiple sections of high-pressure flexible pipes. Of course, the embodiment of this disclosure includes but is not limited thereto. According to the actual construction situation on site, the two devices can also adopt the combination of multiple sections of high-pressure flexible pipes.

In some examples, in the case that the third high-pressure pipe adopts the high-pressure flexible pipe, the length of the third high-pressure pipe or the flexible high-pressure pipe adopted by the third high-pressure pipe is more than 6 meters. Therefore, the high-pressure flexible pipe can directly connect the shunt manifold skid with the fracturing wellhead more conveniently, without the need for combination of multiple sections of high-pressure flexible pipes. In addition, unlike the high-pressure metal pipe, the high-pressure flexible pipe can be bent or curved, so even if the length is more than 6 meters, the transportation can be also convenient.

The following points required to be explained:

(1) the drawings of the embodiments of the present disclosure only relate to the structures related to the embodiments of the present disclosure, and other structures can refer to the general design.

(2) without conflict, the embodiments of the present disclosure and the features in the embodiments may be combined with each other to obtain new embodiments.

The above are only the specific embodiments of this disclosure, but the scope of protection of this disclosure is not limited to this. Any person familiar with this technical field can easily think of changes or substitutions within the technical scope disclosed in this disclosure, which should be covered by the scope of protection of this disclosure. Therefore, the scope of protection of this disclosure should be based on the scope of protection of the claims.

The invention claimed is:

1. A fracturing transportation system, comprising:
a high-low pressure manifold skid, comprising a plurality of first high-pressure input ends and a first high-pressure output end;
a plurality of first high-pressure pipes, arranged in one-to-one correspondence with the first high-pressure input ends, an end of one first high-pressure pipe is directly connected with a corresponding one of the first high-pressure input ends, and another end of the first high-pressure pipe is configured to be directly connected with an output end of a fracturing device; and
a second high-pressure pipe, an end of the second high-pressure pipe is directly connected with the first high-pressure output end,
wherein the first high-pressure pipe and the second high-pressure pipe are configured to bear a pressure greater than or equal to 100 MPa,
the fracturing device is connected to the high-low pressure manifold skid by only the first high-pressure pipe,
the fracturing transportation system further comprises:
a shunt manifold skid, comprising a second high-pressure input end and a second high-pressure output end; and
a third high-pressure pipe,
wherein another end of the second high-pressure pipe is directly connected with the second high-pressure input end, an end of the third high-pressure pipe is directly connected with the second high-pressure output end, and another end of the third high-pressure pipe is configured to be directly connected with a fracturing wellhead,
the high-low pressure manifold skid is connected to the shunt manifold skid by only the second high-pressure pipe, and the shunt manifold skid is connected to the fracturing wellhead by only the third-high pressure pipe,
the first high-pressure pipe between each of the first high-pressure input ends and the output end of the fracturing device is a single continuous high-pressure flexible pipe,
the second high-pressure pipe between the high-low pressure manifold skid and the shunt manifold skid is a single continuous high-pressure flexible pipe,
the third high-pressure pipe between the shunt manifold skid and the fracturing wellhead is a single continuous high-pressure flexible pipe,
the high-pressure flexible pipe comprises a lining layer, at least one internal pressure enhancing layer, a tensile layer and an outer protective layer from inside to outside out, and
at least one of the internal pressure enhancing layer or the tensile layer is a metallic wire winding layer, and at least one of the internal pressure enhancing layer or the tensile layer is a non-metallic wire winding layer.

2. The fracturing transportation system according to claim 1, wherein a diameter of the first high-pressure pipe is in a range from 2 to 5 inches, a diameter of the second high-pressure pipe is in a range from 3 to 7 inches.

3. The fracturing transportation system according to claim 1, wherein a diameter of the third high-pressure pipe is in a range from 3 to 7 inches.

4. The fracturing transportation system according to claim 1, wherein the fracturing transportation system is a fracturing transportation system of fracturing fluid for shale gas exploitation.

5. The fracturing transportation system according to claim 1, wherein a material of the lining layer comprises wear-resistant material.

6. The fracturing transportation system according to claim 5, wherein the at least one internal pressure enhancement layer comprises a plurality of internal pressure enhancement layers, and the high-pressure flexible pipe further comprises an isolation layer located between two adjacent one of the internal pressure enhancement layers and between the internal pressure enhancement layers and the tensile layer.

7. The fracturing transportation system according to claim 5, wherein a material of the lining layer comprises at least one selected from the group consisting of engineering plastics, thermoplastic elastomers and rubber-plastic alloys.

8. The fracturing transportation system according to claim 5, wherein the outer protective layer comprises at least one selected from the group consisting of a rubber layer and a metal armor layer.

9. The fracturing transportation system according to claim 1, wherein a length of the high-pressure flexible pipe adopted by the third high-pressure pipe is more than 6 meters.

10. The fracturing transportation system according to claim 1, wherein the fracturing transportation system comprises a plurality of high-low pressure manifold skids connected in series, and further comprises a fourth high-pressure pipe,
the high-low pressure manifold skid further comprises a third high-pressure input end, an end of the fourth high-pressure pipe is directly connected with the first high-pressure output end of a previous high-low pressure manifold skid among the plurality of high-low pressure manifold skids connected in series, and another end of the fourth high-pressure pipe is directly connected with the third high-pressure input pipe of a next high-low pressure manifold skid among the plurality of high-low pressure manifold skids connected in series,
the second high-pressure pipe is directly connected with the first high-pressure output end of a last high-low pressure manifold skid among the plurality of high-low pressure manifold skids connected in series.

11. The fracturing transportation system according to claim 10, wherein the fourth high-pressure pipe adopts the high-pressure flexible pipe and is configured to bear a pressure greater than or equal to 100 MPa.

12. The fracturing transportation system according to claim 1, wherein the shunt manifold skid comprises a plurality of sub-manifold skids, the fracturing transportation system comprises a plurality of third high-pressure pipes, and the sub-manifold skids and the third high-pressure pipes are arranged in one-to-one correspondence, the plurality of third high-pressure pipes are configured to be directly connected with a plurality of fracturing wellheads, and a number of the plurality of fracturing wellheads is the same as a number of the plurality of sub-manifold skids.

13. The fracturing transportation system according to claim 12, wherein the third high-pressure pipe between each of the sub-manifold skids and a corresponding one of the fracturing wellheads is a single continuous high-pressure flexible pipe.

\* \* \* \* \*